May 2, 1933.  S. C. HOARE  1,906,597
PHOTOMETRIC INSTRUMENT
Filed Aug. 19, 1931
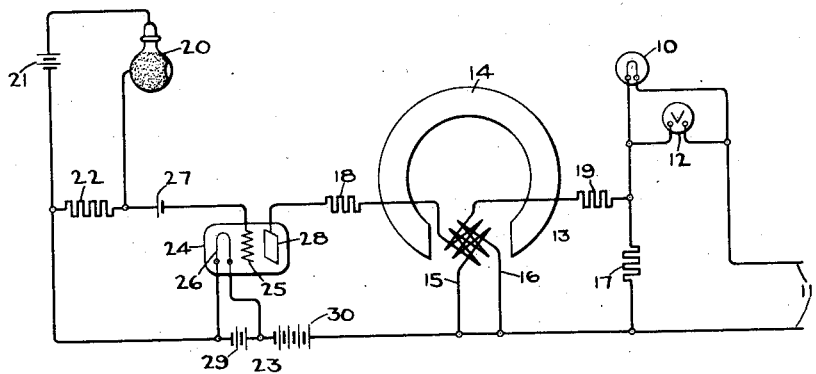
Inventor:
Stephen C. Hoare,
by Charles E. Tullar
His Attorney.

Patented May 2, 1933

1,906,597

UNITED STATES PATENT OFFICE

STEPHEN C. HOARE, OF MANCHESTER, MASSACHUSETTS, ASSIGNOR TO GENERAL ELECTRIC COMPANY, A CORPORATION OF NEW YORK

PHOTOMETRIC INSTRUMENT

Application filed August 19, 1931. Serial No. 558,177.

My invention relates to photo-metric instruments and has for its principal object the provision of a device which will give a direct indication of luminous efficiency, thus eliminating the necessity for tedious computation. Other objects will become apparent from the description. My invention will be better understood from the following description taken in connection with the accompanying drawing and its scope will be pointed out in the accompanying claims.

In accordance with my invention I provide a ratio instrument of any standard type having opposed movable coils. One of the coils is made responsive to the current flowing through the lamp to be tested. The other coil is made responsive to the current flowing through a photo-electric cell which responds to the quantity of light emitted by the lamp being tested. The position of the coils then indicates the ratio of light emitted to current consumed.

Referring to the drawing, an incandescent electric lamp is represented at 10 in circuit with a source of current 11. The source 11 is preferably one in which a high degree of constancy of voltage may be maintained. A voltmeter 12 is provided in order to maintain the lamp 10 at its rated voltage.

The ratio meter 13 is here shown as being one of the cross-coil D'Arsonval type having a permanent magnet 14, a lamp current responsive coil 15, and the coil 16 responsive to the photo-electric cell current but it will be understood that ratio meters of other types may be employed. The coils 15 and 16 are electrically connected so as to produce opposing torques, which are balanced at a certain angular position of the pair of coils with respect to the field of the permanent magnet 14, depending upon the ratio of the torques acting. As the movable coils of the instrument will ordinarily be wound with a large number of turns of fine wire for high sensitivity, I may provide a shunt 17 for the current coil 15, to adapt it to the current flowing through lamp 10. Resistors 18 and 19 are multipliers of suitable resistance to regulate the sensitivity of the moving coils 15 and 16.

A photo-electric cell 20 which is of any standard construction, is so arranged that it will respond to the light emitted by the lamp 10. The photo-electric cell 20 is connected in series with a resistance 22 and a battery 21 so that the current flowing through the resistance 22 varies with the intensity of the light falling upon the photo-electric cell 20. Consequently, the potential difference between the terminals of the resistance 22 depends upon the quantity of light emitted by lamp 10.

In order to increase the magnitude of the indication obtained from the photo-electric cell 20, I employ an amplifier which may take the form of a vacuum tube circuit 23. Vacuum tube 24, having a grid 25, a filamentary cathode 26, and an anode 28 is arranged with its cathode 26 connected to one terminal of the resistance 22, with its grid 25 connected through a grid battery 27 to the other terminal of the resistance 22 so that the grid potential depends upon the potential difference across the resistance 22. The filamentary cathode 26 is heated by current supplied by battery 29. A plate battery 30 is provided to cause current to flow through the coil 16 of the ratio meter 13 in accordance with the variations of the grid potential of the vacuum tube 24 which in turn depend upon the luminous output of lamp 10 as already explained. Although I have shown a device responsive to current flowing through the lamp 10, it will be understood that since I maintain the voltage constant by observing the voltmeter 12, the torque produced in the coil 15 will be proportional to the power input of the lamp 10.

In a suitably designed photo-electric cell the current flowing through it is substantially proportional to the intensity of the light falling upon the cell. The vacuum tube 24 may be so arranged that the current variations in the resistance 22 are amplified in such a manner as to give a variation of torque in the coil 16 which is also substantially proportional to the intensity of the light falling on the photo-electric cell 20. The instrument 13 indicates the ratio of the torques acting upon the opposing coils 15 and 16. Accordingly the instrument 13 indicates the ratio of the light emitted by lamp 10 to the power consumed by it. It will be understood, however, that the operation of my device does not depend upon the shape of the response curve of the photo-electric cell since the ratio meter 13 may be calibrated by testing lamps of known efficiency.

For simplicity I have shown only so much of the apparatus as is necessary to explain its operation, but it will be understood that suitable precautions are to be taken to prevent extraneous light falling upon the photo-electric cell, such as taking readings in a photo-metric dark room, placing the lamp 10 and photo-electric cell in a light-tight box, or employing other means well known in the art.

Since the precise arrangement to be employed in causing the light from lamp 10 to fall upon and affect photo-electric cell 20, forms no part of my invention, I have merely indicated diagrammatically that they are in operative relation. However, it will be understood that my apparatus may be employed in connection with any suitable photo-metric arrangement, whether it be one in which the response of photo-electric cell 20 is dependent upon the candle-power of lamp 10 in a particular direction, the mean horizontal candle-power, or the total luminous flux emitted by lamp 10.

My device will find one of its principal applications in connection with the rapid testing of the efficiency of lamps, constituting regular factory products. When my apparatus is so used it may be calibrated very quickly by connecting a standard lamp of known efficiency and of the same type as the test lamp, in place of the test lamp 10 and adjusting the photo-electric branch of the circuit until the ratio meter 13 indicates the certified efficiency of the standard lamp. The test lamps are then successively connected in the position of 10, and the readings obtained indicate their efficiency.

It is obvious that for tests of this kind the meter may be calibrated directly in lumens per watt regardless of whether the photo-electric cell is arranged to be responsive to the candle-power of lamp 10, or to the total luminous flux of the lamp, since for lamps of the same type the flux distribution curve will be substantially the same and the total flux of the lamp will be proportional to its candle-power.

It will be understood that any of the usual methods employed in photometry for adapting the device to measurements of lamps varying widely in intensity may be employed, such as varying the distance between the light source and the photo-electric cell or interposing rotating sector disks.

It will also be understood that with certain types of photo-electric cells it may be desirable to place color fillers between the lamp 10 and the photo-electric cell 20 in order to obtain a response which is substantially that obtained from the human eye.

Although I have illustrated my device as used in connection with electric lamps of the incandescent type and as used with a given type of photo-electric cell, it will be understood that my device is also applicable to testing other types of light sources, and to using light responsive means different from the standard photo-electric cell now in use. I may, for example, in the case of constant current lamps, arrange the coil 15 to be responsive to variations in voltage instead of variations in current of the circuit supplying the test lamp 10. It will also be understood by those skilled in the art that my invention is not limited to use with electric lamps but that it obviously includes luminous efficiency indicators for other types of lamps as well.

In accordance with the provisions of the patent statutes, I have described the principle of operation of my invention together with the apparatus which I now consider to represent the best embodiment thereof, but I desire to have it understood that the apparatus shown and described is only illustrative and that the invention may be carried out by other arrangements.

What I claim as new and desire to secure by Letters Patent of the United States, is:

1. In combination with a light source, a ratio indicating instrument, having elements responsive respectively to the quantity of light emitted by said light source and the energy consumed thereby, so as to provide an indication of the ratio of light emitted to energy consumed.

2. In combination with a light source and a source of energy therefor, means responsive to its light intensity, and means responsive to the ratio of light intensity to the rate of energy input, controlled jointly by said light responsive means and the rate of energy input.

3. In combination with an electric lamp, means for producing a current dependent upon the quantity of light emitted by said lamp and means controlled jointly by said current and the current flowing through said lamp, to provide an indication of the luminous efficiency thereof.

4. In combination with a circuit supplying an electric lamp, means for maintaining constant the voltage thereof, means for producing a current dependent upon the light intensity of said lamp, and an opposed torque instrument responsive to the ratio of light intensity to power input, controlled jointly by said current and the current flowing through said lamp.

5. In combination with an electric lamp supplied by an electric circuit, an auxiliary circuit including a photo-electric cell and carrying a current controlled by said photo-electric cell responsive to the light emitted by said lamp, and an opposed torque ratio instrument having a pair of torque producing coils, one of which is connected in said auxiliary circuit, and the other of which is connected in circuit with said electric lamp, said ratio instrument providing an indication of the luminous efficiency of said lamp.

6. In combination with a light source, and a source of energy supplying said light source, an instrument indicating the ratio of the quantity of light emitted to the rate of energy consumption and comprising a movable member with a pair of elements, one of which is acted upon by a torque dependent upon the light emitted by said light source, and the other of which is acted upon by an opposing torque dependent upon the rate at which energy is consumed thereby.

In witness whereof, I have hereunto set my hand.

STEPHEN C. HOARE.